(12) United States Patent
Huang

(10) Patent No.: US 10,323,704 B2
(45) Date of Patent: Jun. 18, 2019

(54) BICYCLE BRAKE DISC

(71) Applicant: TIEN HSIN INDUSTRIES CO., LTD., Taichung (TW)

(72) Inventor: Tzu-Tai Huang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 15/722,272

(22) Filed: Oct. 2, 2017

(65) Prior Publication Data

US 2019/0101174 A1    Apr. 4, 2019

(51) Int. Cl.

| B62L 1/00 | (2006.01) |
| B62L 1/06 | (2006.01) |
| B62L 3/02 | (2006.01) |
| F16D 65/12 | (2006.01) |

(52) U.S. Cl.
CPC .......... *F16D 65/128* (2013.01); *B62L 1/005* (2013.01); *B62L 1/06* (2013.01); *B62L 3/023* (2013.01); *F16D 65/121* (2013.01); *F16D 65/123* (2013.01); *F16D 65/125* (2013.01)

(58) Field of Classification Search
CPC .... F16D 65/128; F16D 65/121; F16D 65/123; F16D 65/125; B62L 1/005; B62L 1/06; B62L 3/023
USPC .............. 188/264 R, 264 A, 264 AA, 264 W
See application file for complete search history.

(56) References Cited

U.S. PATENT DOCUMENTS

| 1,925,598 | A | * | 9/1933 | Nelson | F16D 65/827 |
| | | | | | 188/218 R |
| 2,597,603 | A | * | 5/1952 | Tack | B61H 5/00 |
| | | | | | 188/264 A |
| 2,708,011 | A | * | 5/1955 | Ronning | F16D 65/827 |
| | | | | | 188/264 R |
| 3,023,858 | A | * | 3/1962 | Yocom | F16D 65/08 |
| | | | | | 188/264 R |
| 3,142,364 | A | * | 7/1964 | Mikkelson | F16D 65/10 |
| | | | | | 188/218 A |
| 4,913,267 | A | * | 4/1990 | Campbell | F16D 65/128 |
| | | | | | 188/218 XL |
| 5,727,895 | A | * | 3/1998 | Busse | B60T 5/00 |
| | | | | | 188/264 AA |
| 6,186,285 | B1 | * | 2/2001 | Parsons | F16D 65/092 |
| | | | | | 188/250 E |
| 8,474,580 | B2 | * | 7/2013 | Spacek | F16D 65/12 |
| | | | | | 188/18 A |

(Continued)

*Primary Examiner* — Pamela Rodriguez
(74) *Attorney, Agent, or Firm* — WPAT, PC

(57) ABSTRACT

A bicycle brake disc includes: a disc body, having connecting portions extending from an inner periphery of the disc body, and each connecting portion including a connecting hole, and first connecting elements; a rotor carrier having a center hole and carrier arms formed by extending from the center hole to an outer periphery of the rotor carrier, and each carrier arm having a through hole; each heat dissipation baffle has a first and second end portions, and fitting holes, the first and second end portions of each heat dissipation baffle respectively clamped between two adjacent connecting portions and two adjacent carrier arms, so that the connecting hole, the fitting hole, and the through hole are sequentially aligned; and the first connecting element passing through the holes to fixedly connect the disc body, the heat dissipation baffles, and the rotor carrier.

10 Claims, 9 Drawing Sheets

(56) References Cited

U.S. PATENT DOCUMENTS

2002/0166740 A1* 11/2002 Zhang .................. F16D 65/847
  188/264 AA

* cited by examiner

BICYCLE BRAKE DISC

BACKGROUND

Technical Field

The present disclosure relates to brake discs for bicycles, and in particular, to a bicycle brake disc having a heat dissipation baffle with a heat conductivity coefficient greater than that of a material of a disc body, to rapidly dissipate heat and avoid the risk of the entry of a foreign matter.

Related Art

Referring to FIG. 1 and FIG. 2, FIG. 1 and FIG. 2 show a conventional brake disc of a bicycle. The disk-shaped brake disc is basically a circular disc integrally made of steel. A sleeve hole 2 is provided at the center of the brake disc 1 in accordance with a hub 5 of the bicycle, and a plurality of circular connecting holes 3 is annularly distributed and arranged around an outer periphery of the sleeve hole 2. The connecting hole 3 is inserted by a screw 4 to screw the brake disc 1 to the hub 5. On the brake disc 1, a plurality of first holes 6 is arranged adjacent to the connecting holes 3, and a plurality of second holes 7 is annularly arranged adjacent to an outer periphery of the brake disc 1. A plurality of third holes 8 is annularly arranged between the first holes 6 and the second holes 7. The first holes 6, the second holes 7, and the third holes 8 enable the brake disc 1 to achieve a heat dissipation effect during braking.

When wheels of the bicycle move on the road, a rider manually controls a brake 110 on a handle bar 100 of the bicycle during deceleration and braking. The brake 110 pulls a hydraulic oil tube 120 to control a brake caliper 140 which is mounted to a front fork 130 of the bicycle to properly clamp the brake disc 1, making the brake disc 1 stop rotating or decelerate.

Therefore, during braking, heat is generated due to clamping friction exerted to the brake disc 1 by the brake caliper 140. The conventional brake disc 1 does not have a heat dissipation apparatus for cooling. Consequently, the connecting holes 3 on the brake disc 1 easily deform due to a high temperature, and the brake disc 1 cannot be stably screwed to the hub 5 of the bicycle. Further, fluid in the hydraulic oil tube 120 probably boils due to poor heat dissipation, reducing a service life of the hydraulic oil tube 120. In addition, if the third hole 8 on the brake disc 1 is stuck by a foreign matter such as a finger or by a sudden rigid foreign matter such as a branch during riding, the bicycle would instantly brake and stop, resulting in the risk of overturn of the rider and the bicycle. Therefore, a general solution in the industry is to add a protective cover outside the brake disc 1 to ensure the safety of a user. However, the added protective cover also increases the manufacturing and assembling costs and weight.

SUMMARY

A main objective of the present disclosure is to provide a bicycle brake disc having a heat dissipation function, to effectively avoid a brake failure caused by deformation and being unstable of a disc body and boiling of fluid in a hydraulic oil tube when heat is generated due to friction between a brake caliper and the disc body.

Another objective of the present disclosure is to prevent a hole of a brake disc from being stuck by a sudden foreign matter during riding, thereby avoiding the risk of overturn of a rider and a bicycle and the risk of putting a finger in.

To achieve the foregoing objectives, the present disclosure provides a bicycle brake disc, comprising: a disc body, provided with a plurality of first holes, where a plurality of connecting portions is formed by extending from an inner periphery of the disc body to a center of the disc body, and each of the connecting portions 12 is provided with a connecting hole; a rotor carrier, provided with a center hole, where a plurality of carrier arms is formed by extending from the center hole to an outer periphery of the rotor carrier, and each of the carrier arms is provided with a through hole; a plurality of heat dissipation baffles, where each of the plurality of heat dissipation baffles is provided with a plurality of second holes and at least one fitting hole; and a plurality of first connecting elements, where each of the plurality of first connecting elements comprises a head portion and a connecting portion, and the first connecting element passes through the connecting hole, the fitting hole, and the through hole to connect the disc body, the heat dissipation baffle, and the rotor carrier.

The carrier arm further comprises a tail portion and a flange, where the tail portion is disposed on one end of the carrier arm away from the center hole, the through hole is provided on the tail portion, the flange is disposed between an inner periphery of the rotor carrier and the tail portion, and a slot is provided between two adjacent carrier arms and at a position adjacent to the center hole.

The heat dissipation baffle further comprises a first end portion and a second end portion, structures of the first end portion and the second end portion each cooperate with a flange of the carrier arm, and the fitting hole is provided on each of the first end portion and the second end portion, so that the heat dissipation baffle is clamped between the disc body and the rotor carrier by means of the first end portion and the second end portion.

The heat dissipation baffle further comprises a base portion, the base portion is disposed between the first end portion and the second end portion, and cooperates with a slot of the rotor carrier, so to be clamped between a hub of a bicycle and the rotor carrier.

A heat dissipation layer is provided on a surface of the connecting portion of the first connecting element.

A material of the heat dissipation layer on the surface of the connecting portion is selected from one of a composite having a metal composition, a liquid ceramic, and graphene.

A material of the disc body is selected from one or a combination of stainless steel, cast iron, an aluminum alloy, a carbon fiber composite, and a ceramic material.

A heat dissipation layer is provided on a surface of the heat dissipation baffle.

A material of the heat dissipation layer on the surface of the heat dissipation baffle is selected from one of a composite having a metal composition, a liquid ceramic, and graphene.

A composing material of the heat dissipation baffle is a material with a heat conductivity coefficient greater than that of the disc body.

Therefore, a rider controls a brake of a bicycle, and the hydraulic oil tube is pulled to control the brake caliper so as to tightly clamp the brake disc 1, making the disc body decelerate or stop rotating. Heat is generated when clamping friction is exerted to the disc body by the brake caliper, and is transferred to the heat dissipation baffles through the first connecting elements. Owing to that the surface of the connecting portion of the first connecting element is provided with the heat dissipation layer, and the heat conductivity coefficient of the composing material of the heat dissipation baffle is greater than that of the material of the disc body or that of the heat dissipation layer provided on the surface of the heat dissipation baffle, the effects of rapid heat dissipation and rapid temperature decrease can be achieved. Also, the heat dissipation baffle has a plurality of second holes capable of accelerating the heat dissipation and then decreasing temperatures, thereby effectively avoiding a reduction in a service life of the hydraulic oil tube caused by the boiling fluid in the hydraulic oil tube boils due to a high temperature from the disc body and further avoiding deformation of the connecting holes due to the high temperature of the disc body, ensuring that the disc body can be stably attached to the hub.

Further, the heat dissipation baffle of the present disclosure is provided in the assembly space, so that a gap allowing no foreign matter or human finger to put in is formed in the assembly space. Therefore, the present disclosure can completely prevent entry of a foreign matter that instantly stops rotation of wheels of the bicycle, so as to avoid the risk of overturn of the rider and the risk of putting a finger in. In addition, a protective cover may not be mounted. In this way, the manufacturing and mounting costs and weight can be reduced.

DETAILED DESCRIPTION

Details and technical descriptions related to the present disclosure are further described by following embodiments. It should be understood that the embodiments are merely used as examples for description, and shall not be construed as a limitation to implementation of the present disclosure.

Figure 1:
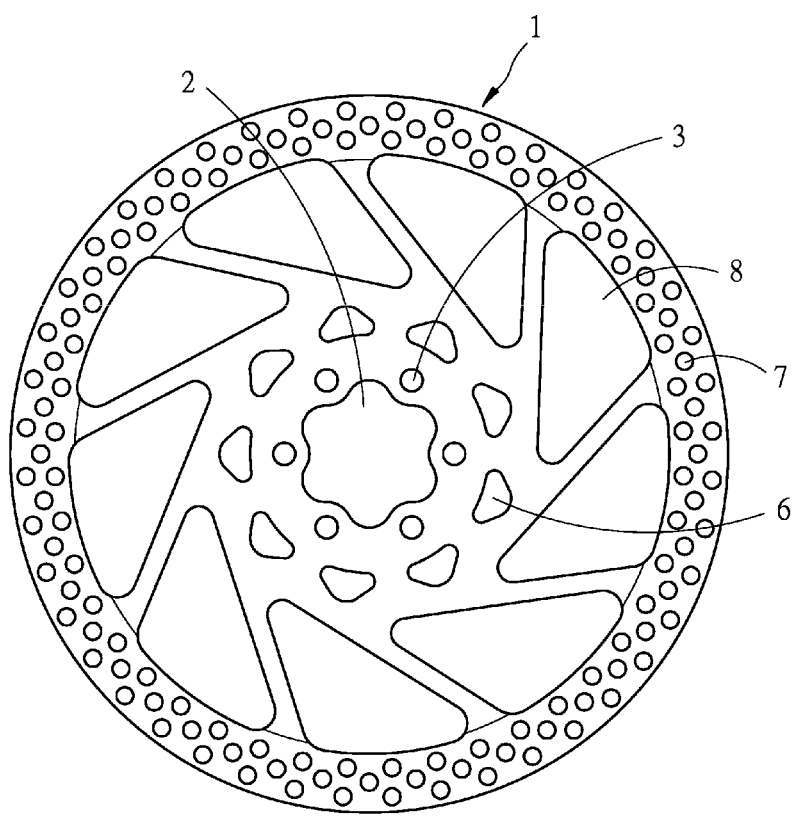
FIG. 1 shows a conventional disk-shaped brake disc of a bicycle.
Figure 2:
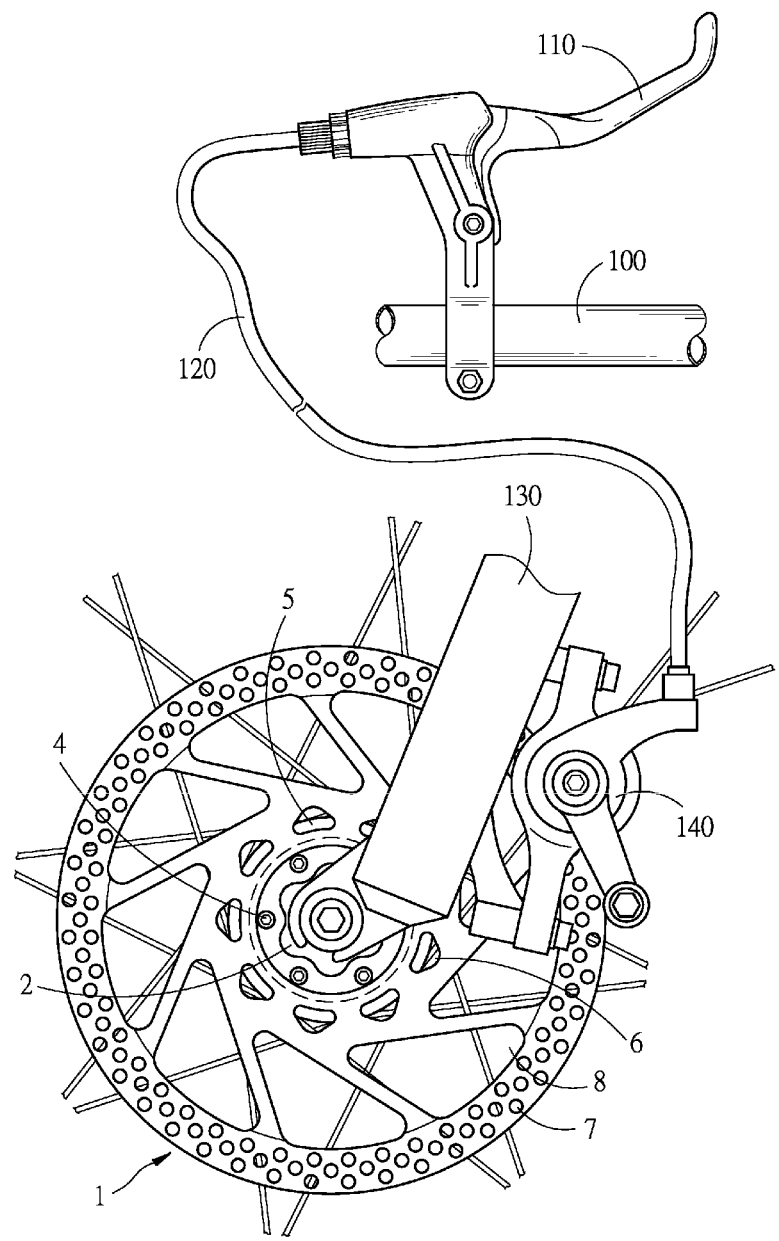
FIG. 2 is a schematic diagram of cooperation between a conventional disk-shaped brake disc of a bicycle and a brake of the bicycle.
Figure 3A:
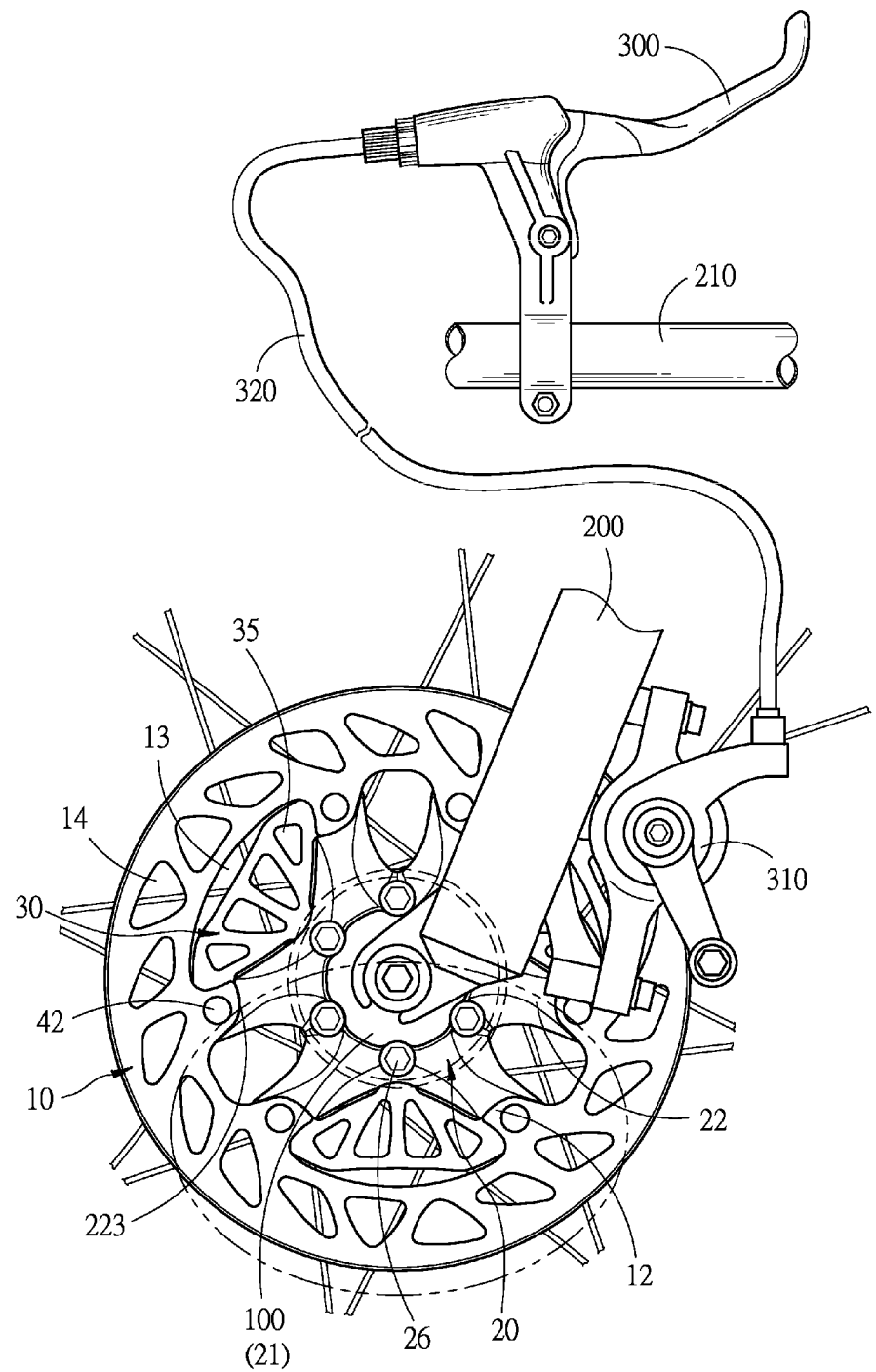
FIG. 3A is a schematic diagram of cooperation within a bicycle brake according to an embodiment of the present disclosure.
Figure 3B:
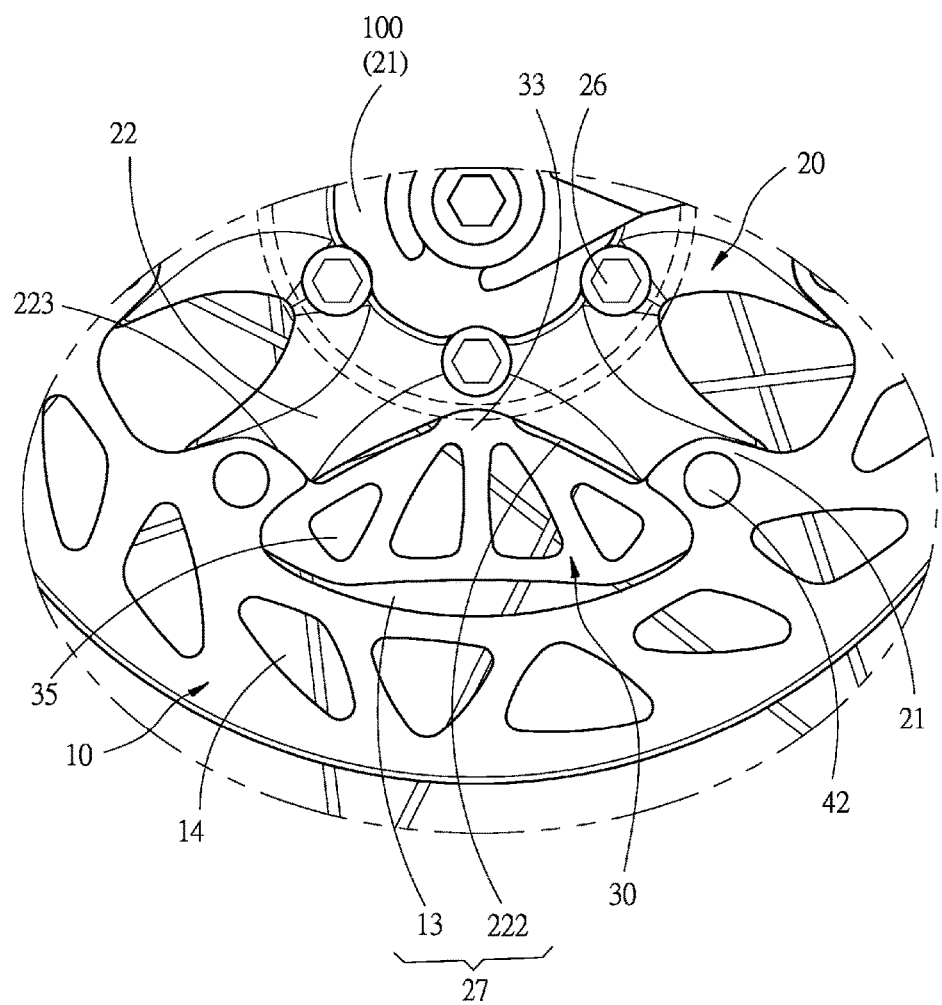
FIG. 3B is an enlarged partial view of FIG. 3A.
Figure 4:
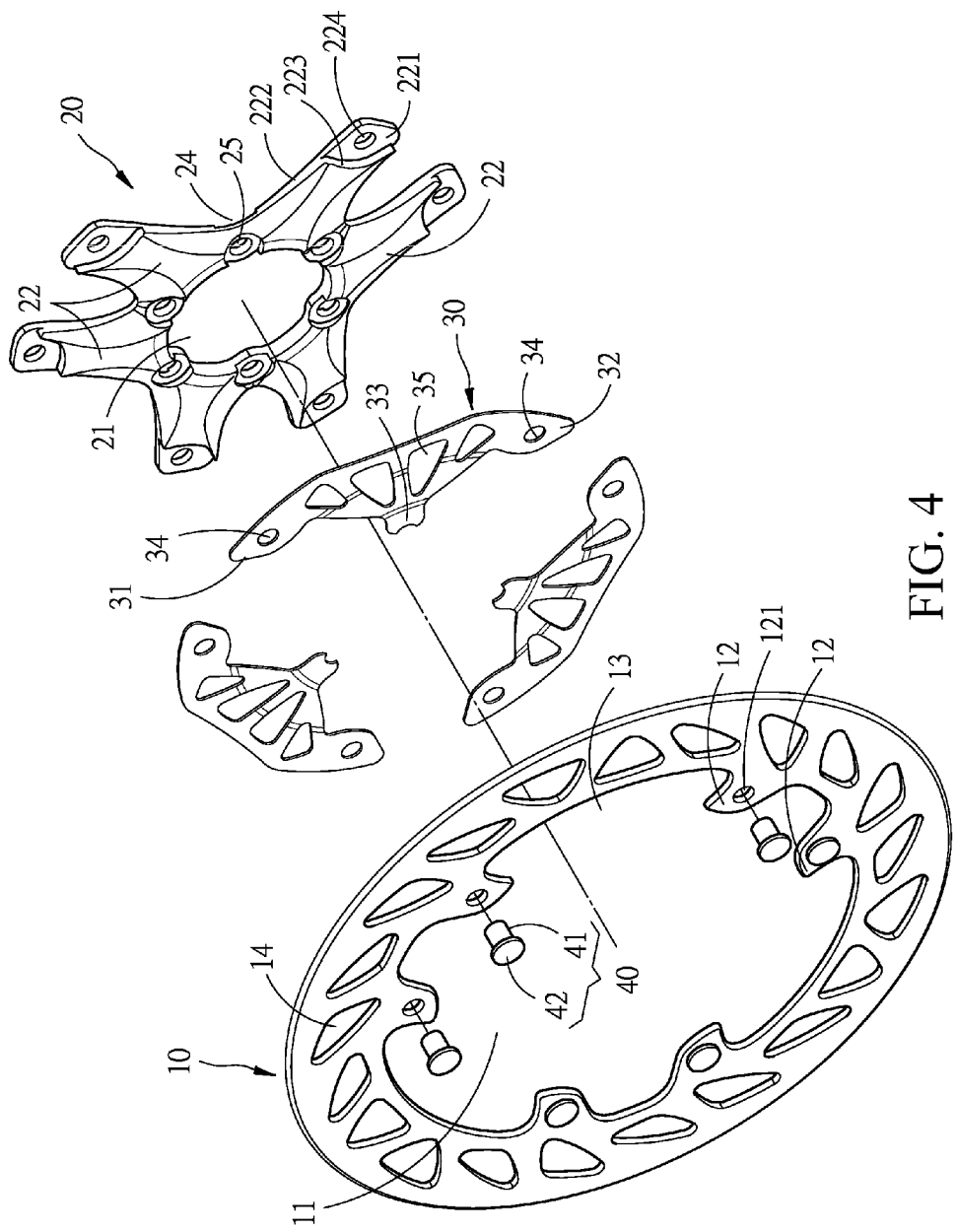
FIG. 4 is a three-dimensional exploded view according to an embodiment of the present disclosure.
Figure 5:
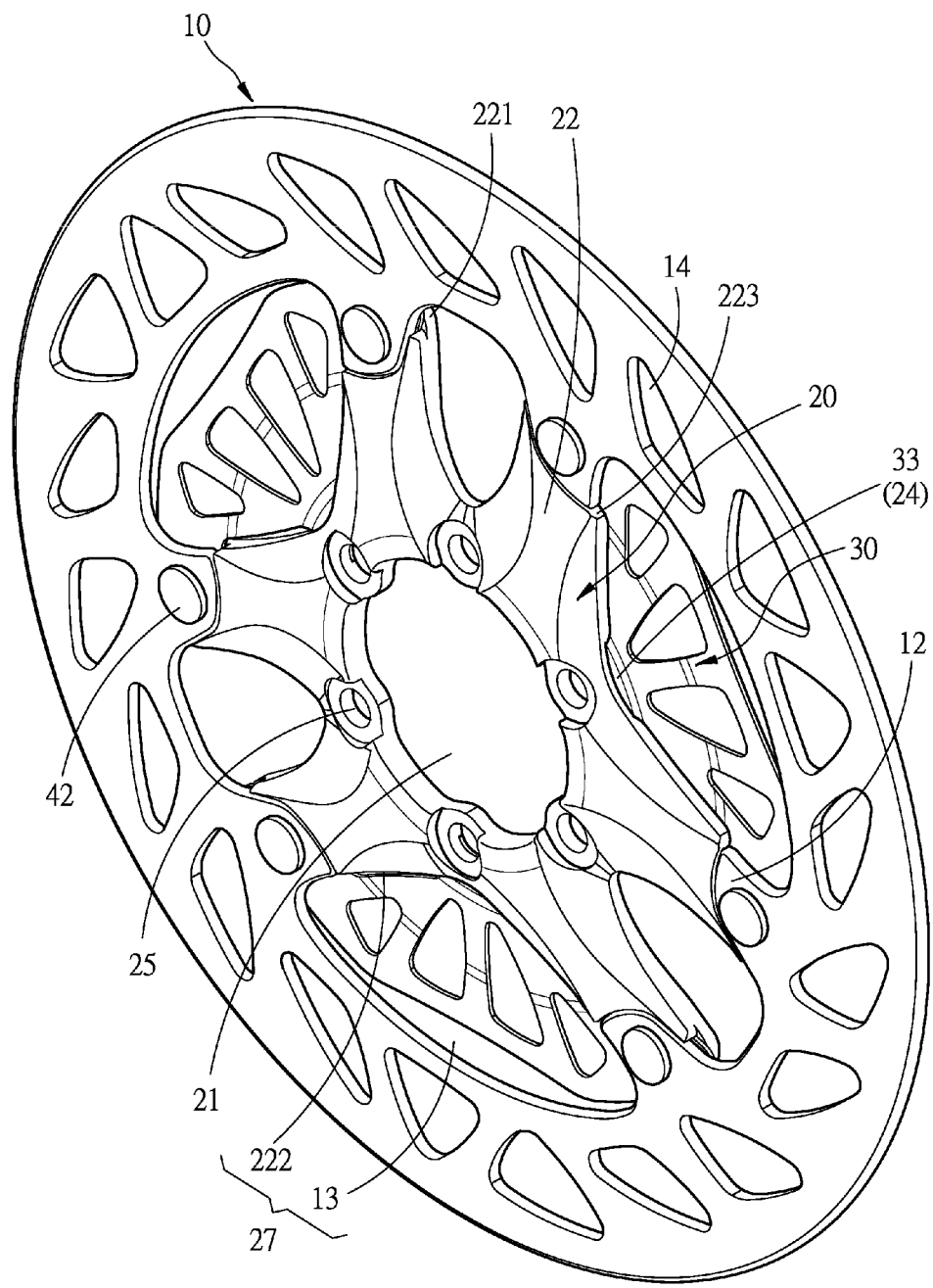
FIG. 5 is a three-dimensional assembled view according to an embodiment of the present disclosure.
Figure 6A:
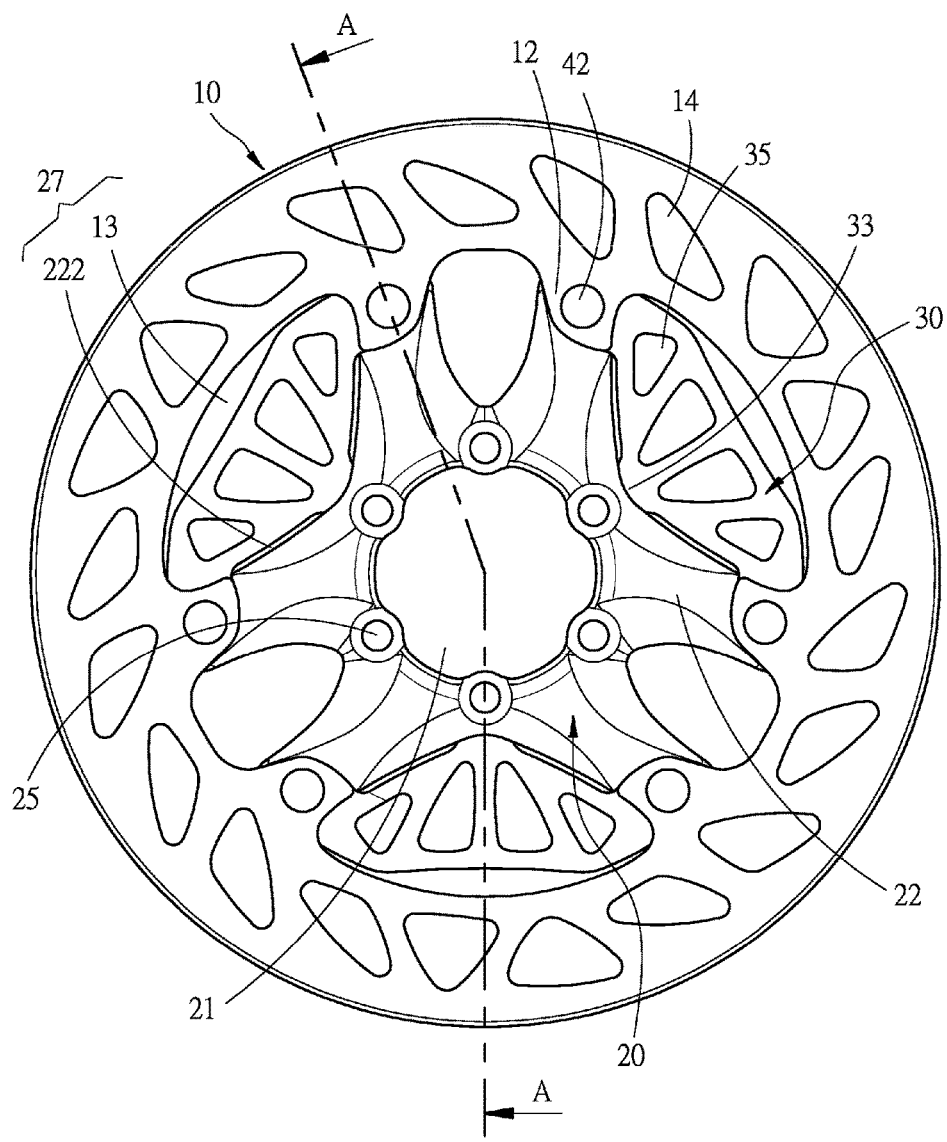
FIG. 6A is a left side view of an assembly according to an embodiment of the present disclosure.
Figures 6B, 6C:
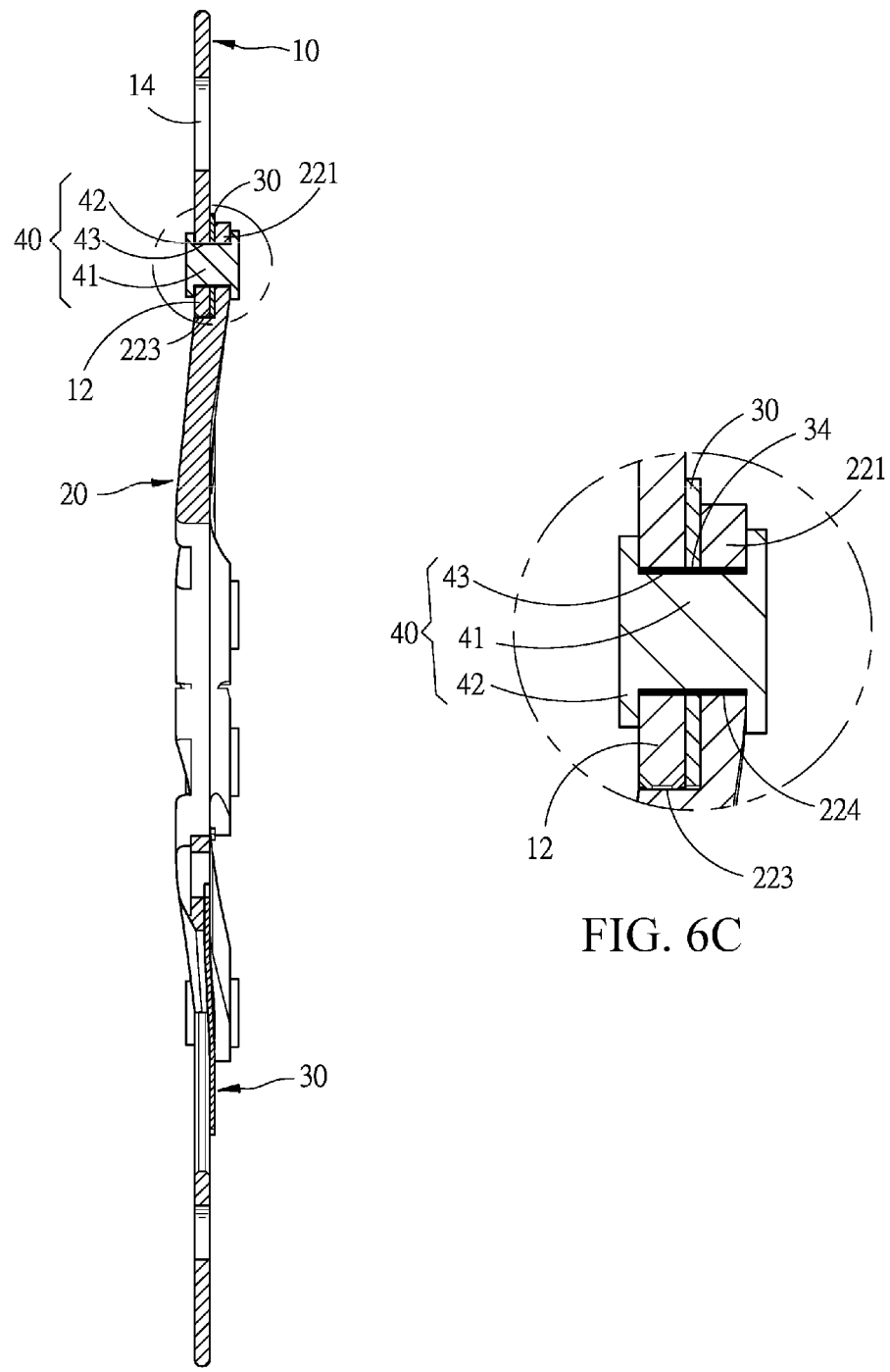
FIG. 6B is a sectional view of FIG. 6 along a line A-A.
FIG. 6C is an enlarged view of FIG. 6B.
Figure 7:
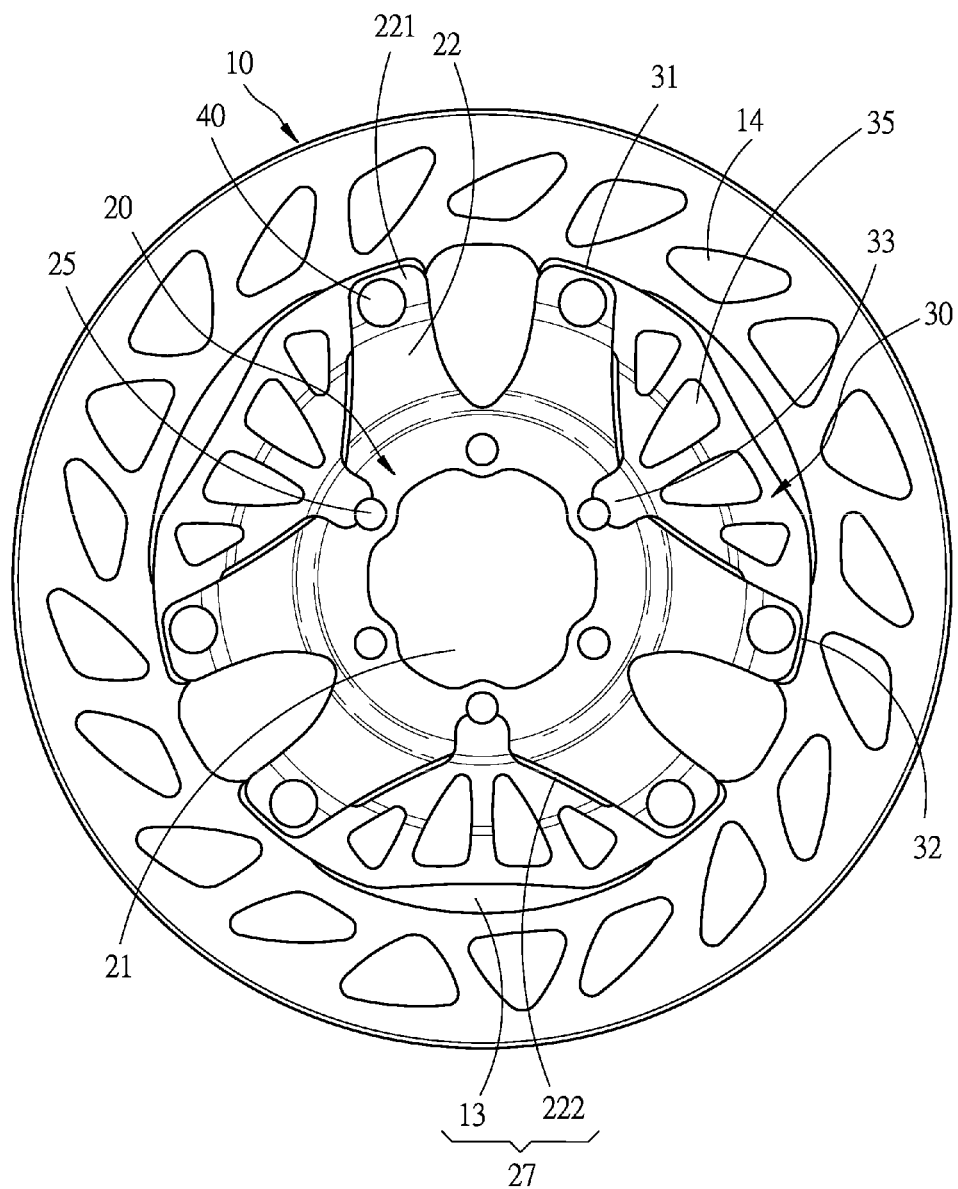
FIG. 7 is a right side view of an assembly according to an embodiment of the present disclosure.

Referring to FIG. 3A and FIG. 3B, the present disclosure provides a bicycle brake disc, mounted between a hub 100 of a bicycle and a front fork 200 of the bicycle and clamped by a brake caliper 310 mounted to the front fork 200 of the bicycle, to decelerate or brake and stop wheels of the bicycle. The brake caliper 310 and a brake 300 on a handle bar 210 of the bicycle are connected by using a hydraulic oil tube 320.

Further referring to FIG. 4 to FIG. 7, the present disclosure includes: a disc body 10, a rotor carrier 20, a plurality of heat dissipation baffles 30, and a plurality of first connecting elements 40.

The disc body 10 has an inner space 11, a plurality of connecting portions 12, and a plurality of first holes 14. The connecting portion 12 is formed by extending from an inner periphery of the disc body 10 to the inner space 11, and each of the connecting portions 12 is provided with a connecting hole 121. A first recess 13 is formed between two adjacent connecting portions 12 at the inner periphery of the disc body 10. The first holes 14 are annularly provided on the disc body 10. The disc body 10 is selected from one or a combination of stainless steel, cast iron, an aluminum alloy, a carbon fiber composite, and a ceramic material.

The rotor carrier 20 has a center hole 21 and a plurality of carrier arms 22. The rotor carrier 20 cooperates with the hub 100 of the bicycle by using a center hole 21. The carrier arm 22 extends from the center hole 21 to be formed on an outer periphery of the rotor carrier 20. A second recess 222 is formed between two adjacent carrier arms 22, and the second recess 222 and the first recess 13 of the disc body 10 cooperate with each other to form an assembly space 27.

As shown in FIG. 3A, FIG. 3B, FIG. 5, FIG. 6A, and FIG. 7, a slot 24 is provided on a surface facing the hub 100 and at a midpoint of the second recess 222. A plurality of assembly holes 25 is annularly arranged at an inner periphery of the rotor carrier 20 and adjacent to the center hole 21. Each of the assembly holes 25 is inserted by a second connecting element 26 (which is a bolt in this embodiment) and is screwed to the hub 100.

The carrier arm 22 extends from the center hole 21 and formed on the outer periphery of the rotor carrier 20. One end of the carrier arm 22 away from the center hole 21 has a tail portion 221. A thickness of the tail portion 221 is less than a thickness of the other end of the carrier arm 22 close to the center hole 22, and therefore a thickness difference appears. A flange 223 is formed on the carrier arm 22 and near the tail portion 221. The tail portion 221 is provided with a through hole 224. A structure of the flange 223 abuts to the connecting portion 12 of the disc body 10.

The heat dissipation baffle 30 is disposed in the assembly space 27 between the second recess 222 of the rotor carrier 20 and the first recess 13 of the disc body 10. The heat dissipation baffle 30 is made of a material with a heat conductivity coefficient greater than that of the disc body 10, or a heat dissipation layer is provided on a surface of the heat dissipation baffle 30. In this embodiment, the heat dissipation layer is coated on the surface of the heat dissipation baffle 30. Alternatively, the heat dissipation baffle 30 may be made of a material with a heat conductivity coefficient greater than that of the disc body 10, and a heat dissipation layer is provided and coated on a surface of the heat dissipation baffle 30. The heat dissipation layer on the surface of the heat dissipation baffle 30 may be selected from one of a composite having a metal composition, a liquid ceramic, and graphene.

Each of the heat dissipation baffles 30 has a first end portion 31, a second end portion 32, and a plurality of second holes 35. Each of the first end portion 31 and the second end portion 32 is provided with a fitting hole 34. The second holes 35 are distributed and arranged between the two fitting holes 34, and a base portion 33 extending towards an inner periphery is disposed between the first end portion 31 and the second end portion 32. A structure of the base portion 33 cooperates with the assembly hole 25 of the rotor carrier 20. The fitting holes 34 of the first end portion 31 and the second end portion 32 of the heat dissipation baffle 30 are aligned with the connecting holes 121 of the disc body 10.

The first connecting element 40 includes a cylindrical connecting portion 41 and a head portion 42 located at one end of the connecting portion 41. A heat dissipation layer 43 is covered on a surface of the connecting portion 41. In this embodiment, the first connecting element 40 is a rivet, and the first connecting element 40 passes through and is riveted with the sequentially arranged holes, including the connecting hole 121 of the disc body 10, the fitting hole 34 of the heat dissipation baffle 30, and the through hole 224 of the rotor carrier 20, so that the disc body 10, the heat dissipation baffle 30, and the rotor carrier 20 are fixedly connected.

Referring to FIG. 3A and FIG. 4 to FIG. 7, in this embodiment, the disc body 10 includes six connecting portions 12, and the rotor carrier 20 includes six carrier arms 22 and three heat dissipation baffles 30. During assembling, each of the heat dissipation baffles 30 cooperates with the slot 24 of the rotor carrier 20 by the base portion 33, the first end portion 31 and the second end portion 32 are respectively clamped between two adjacent connecting portions 12 and two adjacent tail portions 221. Then the first connecting element 40 passes through and is riveted with the connecting hole 121 of the disc body 10, the fitting hole 34 of the heat dissipation baffle 30, and the through hole 224 of the rotor carrier 20, so that the disc body 10, the heat dissipation baffle 30, and the rotor carrier 20 are fixedly connected, and the heat dissipation baffle 30 is assembled in the assembly space 27. The rotor carrier 20 is screwed to the hub 100 by inserting the second connecting element 26 into the assembly hole 25.

Therefore, when the bicycle travels, the wheels are driven to rotate as the hub 100 rotates, the rotor carrier 20 rotates with the hub 100, and the disc body 10 and the heat dissipation baffles 30 rotate at the same time. During deceleration or braking, the rider pulls the brake 300 to make the fluid in the hydraulic oil tube 320 flow, so as to control the brake caliper 310 to tightly clamp the disc body 10, so that the disc body 10 decelerates or stops rotating. Heat is generated when clamping friction is exerted to the disc body 10 by the brake caliper 310, and is transferred to the heat dissipation baffles 30 through the first connecting elements 40. In the present disclosure, the heat is dissipated by the heat dissipation layer 43 on the surface of the connecting portion 41 of the first connecting element 40. Also, the heat dissipation baffle 30 is made of the material with a heat conductivity coefficient greater than that of the disc body 10 so that the heat on the disc body 10 can be quickly dissipated for cooling. In addition to the first holes 14 of the disc body 10, the second holes 35 of the heat dissipation baffles 30 are further included, so that airflow can rapidly pass through and then temperature will decrease more quickly of the disc body 10, thereby effectively avoiding a brake failure caused by the boiling fluid in the hydraulic oil tube 320 due to a high temperature of the disc body 10, and further avoiding deformation of the assembly holes 25 due to the high temperature of the disc body 10, ensuring that the disc body 10 can be stably fastened to the hub 100.

In the present disclosure, beside the foregoing heat dissipation function, heat dissipation baffle 30 is provided in the assembly space 27 which is formed between the first recess 13 of the disc body 10 and the second recess 222 of the rotor carrier 20, and forms a gap allowing no foreign matter or human finger to put in. Therefore, the present disclosure can completely prevent entry of a foreign matter that instantly stops rotation of the wheels of the bicycle, so as to avoid the risk of overturn of the rider and the bicycle. In addition, a protective cover may not be mounted. In this way, the manufacturing and mounting costs and weight can be reduced.

The foregoing are merely preferred embodiments of the present disclosure. The implementation scope of the present disclosure, however, is not limited to the foregoing descriptions. That is, any simple equivalent changes and modifications made based on the scope of the present disclosure and the descriptions of the present disclosure should be construed as falling within the scope of the present disclosure.

What is claimed is:

1. A bicycle brake disc, comprising:
a disc body, provided with a plurality of first holes, wherein a plurality of connecting portions is formed by extending from an inner periphery of the disc body to a center of the disc body, and each of the connecting portions is provided with a connecting hole;
a rotor carrier, provided with a center hole, wherein a plurality of carrier arms is formed by extending from the center hole to an outer periphery of the rotor carrier, and each of the carrier arms is provided with a through hole;
a plurality of heat dissipation baffles, wherein each of the plurality of heat dissipation baffles is provided with a plurality of second holes and at least one fitting hole; and
a plurality of first connecting elements, wherein each of the plurality of first connecting elements comprises a head portion and a connecting portion, wherein each first connecting element passes through each connecting hole, each fitting hole, and each through hole to connect the disc body, each heat dissipation baffle, and the rotor carrier.

2. The bicycle brake disc according to claim 1, wherein each carrier arm further comprises a tail portion and a flange, wherein each tail portion is disposed on one end of the carrier arm away from the center hole, each through hole is provided on each tail portion, each flange is disposed between an inner periphery of the rotor carrier and the tail portion, and a slot is provided between two adjacent carrier arms and at a position adjacent to the center hole.

3. The bicycle brake disc according to claim 1, wherein each heat dissipation baffle further comprises a first end portion and a second end portion, structures of each first end portion and each second end portion each cooperate with a corresponding flange of a corresponding carrier arm, and each fitting hole is provided on each of the first end portions and the second end portions, so that each heat dissipation baffle is clamped between the disc body and the rotor carrier by means of each first end portion and each second end portion.

4. The bicycle brake disc according to claim 3, wherein each heat dissipation baffle —further comprises a base portion, each base portion is disposed between each first end portion and each second end portion, and cooperates with a slot of the rotor carrier, so to be clamped between a hub of a bicycle and the rotor carrier.

5. The bicycle brake disc according to claim 1, wherein a heat dissipation layer is provided on a surface of each connecting portion of each connecting element.

6. The bicycle brake disc according to claim 5, wherein a material of the heat dissipation layer on the surface of each connecting portion is selected from one of a composite having a metal composition, a liquid ceramic, and a graphene.

7. The bicycle brake disc according to claim 1, wherein a material of the disc body is selected from one or a combination of stainless steel, cast iron, an aluminum alloy, a carbon fiber composite, and a ceramic material.

8. The bicycle brake disc according to claim 1, wherein a heat dissipation layer is provided on a surface of each heat dissipation baffle.

9. The bicycle brake disc according to claim 8, wherein each heat dissipation layer is selected from one of a composite having a metal composition, a liquid ceramic, and graphene.

10. The bicycle brake disc according to claim 1, wherein a composing material of each heat dissipation baffle is a material with a heat conductivity coefficient greater than that of the disc body.

* * * * *